(12) United States Patent
Jaquette et al.

(10) Patent No.: US 11,150,994 B2
(45) Date of Patent: Oct. 19, 2021

(54) CREATING A RESTORE COPY FROM A COPY OF SOURCE DATA IN A REPOSITORY HAVING SOURCE DATA AT DIFFERENT POINT-IN-TIMES

(71) Applicant: INTERNATIONAL BUSINESS MACHINES COPORATION, Armonk, NY (US)

(72) Inventors: Glen A. Jaquette, Tucson, AZ (US); Gregory T. Kishi, Oro Valley, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

(21) Appl. No.: 16/277,998

(22) Filed: Feb. 15, 2019

(65) Prior Publication Data
US 2019/0179708 A1  Jun. 13, 2019

Related U.S. Application Data

(63) Continuation of application No. 14/175,980, filed on Feb. 7, 2014, now Pat. No. 10,372,546.

(51) Int. Cl.
*G06F 11/14* (2006.01)
*G06F 16/11* (2019.01)

(52) U.S. Cl.
CPC ...... *G06F 11/1448* (2013.01); *G06F 11/1469* (2013.01); *G06F 16/128* (2019.01); *G06F 2201/84* (2013.01)

(58) Field of Classification Search
CPC ............... G06F 11/1448; G06F 16/128; G06F 11/1469; G06F 2201/84
(Continued)

(56) References Cited

U.S. PATENT DOCUMENTS 6,594,744 B1   7/2003   Humlicek et al.
6,912,629 B1   6/2005   West et al.
(Continued)

FOREIGN PATENT DOCUMENTS

CN   1071770 A   5/1993
CN   1740981 A   3/2006
(Continued)

OTHER PUBLICATIONS

Response dated Apr. 10, 2011, pp. 16, to Office Action dated Jan. 10, 2019, pp. 15, for U.S. Appl. No. 14/175,964.
(Continued)

*Primary Examiner* — Michael Pham
(74) *Attorney, Agent, or Firm* — Konrad Raynes Davda & Victor LLP; David W. Victor (57) ABSTRACT

Provided are a computer program product, system, and method for creating a restore copy from a copy of source data in a repository having source data at different point-in-times. All the source data as of an initial point-in-time is copied to a repository. In response to completing point-in-time copies following the initial point-in-time, change information is transmitted to the repository indicating changed data in the source data that changed between the point-in-time of the point-in-time copy and a subsequent point-in-time. For each point-in-time copy, copying changed source data comprising source data indicated in the change information for the point-in-time copy as changed to the repository. A restore request is received to restore the source data as of a restore point-in-time. The source data in the repository as of the restore point-in-time is copied from the repository to a restore copy.

17 Claims, 8 Drawing Sheets

(58) Field of Classification Search
USPC .................................................. 707/649
See application file for complete search history.

(56) References Cited

U.S. PATENT DOCUMENTS

| | | |
|---|---|---|
| 7,107,486 B2 | 9/2006 | Okada et al. |
| 7,133,884 B1 | 11/2006 | Murley et al. |
| 7,272,693 B2 | 9/2007 | Ushijima et al. |
| 7,284,104 B1 | 10/2007 | Wu et al. |
| 7,318,134 B1 | 1/2008 | Oliveira et al. |
| 7,529,782 B2 | 5/2009 | Prahlad et al. |
| 7,650,533 B1 | 1/2010 | Saxena et al. |
| 7,716,438 B2 | 5/2010 | Ushijima et al. |
| 7,809,691 B1 | 10/2010 | Karmarkar et al. |
| 7,822,717 B2 | 10/2010 | Kapoor et al. |
| 7,836,267 B1 | 11/2010 | Cross |
| 7,934,064 B1 | 4/2011 | Per et al. |
| 7,958,326 B2 | 6/2011 | Amano et al. |
| 8,060,713 B1 | 11/2011 | Natanzon |
| 8,095,804 B1 | 1/2012 | Armangau et al. |
| 8,099,572 B1 | 1/2012 | Arora et al. |
| 8,166,128 B1 | 4/2012 | Faulkner et al. |
| 8,250,033 B1 | 8/2012 | De Souter et al. |
| 8,260,752 B1 | 9/2012 | Stringham et al. |
| 8,352,422 B2 | 1/2013 | Prahlad et al. |
| 8,375,158 B2 | 2/2013 | Cho |
| 8,380,939 B2 | 2/2013 | Agesen |
| 8,386,733 B1 | 2/2013 | Tsaur et al. |
| 8,417,872 B2 | 4/2013 | Bae et al. |
| 8,453,145 B1 | 5/2013 | Naik |
| 8,473,697 B1 | 6/2013 | Tiwari et al. |
| 8,495,316 B2 | 7/2013 | Nagarkar et al. |
| 8,555,009 B1 | 10/2013 | Majahan et al. |
| 8,566,510 B2 | 10/2013 | Weingarten |
| 8,666,944 B2 | 3/2014 | Beatty et al. |
| 8,738,874 B2 | 5/2014 | Nemoto et al. |
| 8,738,883 B2 | 5/2014 | Wade et al. |
| 8,788,769 B2 | 7/2014 | Abercrombie et al. |
| 8,818,936 B1 | 8/2014 | Haase et al. |
| 8,819,362 B1 | 8/2014 | Duprey et al. |
| 8,904,125 B1 | 12/2014 | Elling et al. |
| 9,218,138 B1 | 12/2015 | Haase et al. |
| 10,176,048 B2 | 1/2019 | Jaquette et al. |
| 10,241,691 B2 | 3/2019 | Jain et al. |
| 10,372,546 B2 | 8/2019 | Jaquette et al. |
| 2003/0167380 A1 | 9/2003 | Green et al. |
| 2004/0117572 A1 | 6/2004 | Welsh et al. |
| 2004/0158766 A1 | 8/2004 | Liccione et al. |
| 2004/0186968 A1 | 9/2004 | Factor et al. |
| 2004/0260726 A1 | 12/2004 | Hrle et al. |
| 2004/0260895 A1 | 12/2004 | Werner et al. |
| 2005/0108302 A1 | 5/2005 | Rand et al. |
| 2005/0210320 A1 | 9/2005 | Vincent |
| 2005/0216788 A1 | 9/2005 | Mani-Meitav et al. |
| 2006/0041727 A1 | 2/2006 | Adkins et al. |
| 2006/0173935 A1 | 8/2006 | Merchant et al. |
| 2006/0224636 A1 | 10/2006 | Kathuria et al. |
| 2007/0022319 A1 | 1/2007 | Haselton et al. |
| 2007/0055833 A1 | 3/2007 | Vu et al. |
| 2007/0245104 A1 | 10/2007 | Lindemann et al. |
| 2007/0276885 A1 | 11/2007 | Valiyaparambil et al. |
| 2007/0277010 A1 | 11/2007 | Anand et al. |
| 2007/0277012 A1 | 11/2007 | Hara et al. |
| 2007/0294495 A1 | 12/2007 | Uchida et al. |
| 2008/0077629 A1 | 3/2008 | Lorenz et al. |
| 2008/0098195 A1 | 4/2008 | Cheon et al. |
| 2008/0154914 A1 | 6/2008 | Kan et al. |
| 2008/0162590 A1 | 7/2008 | Kundu et al. |
| 2008/0243954 A1 | 10/2008 | Augenstein et al. |
| 2008/0313414 A1 | 12/2008 | Shackelford |
| 2009/0150626 A1 | 6/2009 | Benhase et al. |
| 2009/0150641 A1* | 6/2009 | Flynn ............... G06F 12/1018 711/202 |
| 2009/0193064 A1 | 7/2009 | Chen et al. |
| 2009/0307286 A1 | 12/2009 | Laffin |
| 2010/0042791 A1 | 2/2010 | Helman et al. |
| 2010/0049929 A1 | 2/2010 | Nagarkar et al. |
| 2010/0057789 A1 | 3/2010 | Kawaguchi |
| 2011/0055500 A1 | 3/2011 | Sasson et al. |
| 2011/0093436 A1 | 4/2011 | Zha et al. |
| 2011/0107025 A1 | 5/2011 | Urkude et al. |
| 2011/0173404 A1 | 7/2011 | Eastman et al. |
| 2011/0191295 A1 | 8/2011 | Ozdemir et al. |
| 2012/0078855 A1 | 3/2012 | Beatty et al. |
| 2012/0130956 A1 | 5/2012 | Caputo |
| 2012/0136832 A1 | 5/2012 | Sadhwani |
| 2012/0158662 A1 | 6/2012 | Buragohain et al. |
| 2012/0179655 A1 | 7/2012 | Beatty et al. |
| 2012/0197842 A1 | 8/2012 | Marie et al. |
| 2012/0203742 A1* | 8/2012 | Goodman ............. G06F 16/122 707/646 |
| 2012/0278539 A1 | 11/2012 | Hosogaya |
| 2012/0284232 A1 | 11/2012 | Fiske |
| 2012/0290802 A1 | 11/2012 | Wade et al. |
| 2013/0006944 A1 | 1/2013 | Prahlad et al. |
| 2013/0042054 A1 | 2/2013 | Jung et al. |
| 2013/0046734 A1 | 2/2013 | Cisler et al. |
| 2013/0103649 A9 | 4/2013 | Linde |
| 2013/0132346 A1 | 5/2013 | Varadarajan |
| 2013/0173552 A1 | 7/2013 | Marie et al. |
| 2013/0318318 A1 | 11/2013 | Nemoto et al. |
| 2013/0326125 A1 | 12/2013 | Chang et al. |
| 2014/0052693 A1 | 2/2014 | Zha et al. |
| 2014/0095823 A1 | 4/2014 | Shaikh et al. |
| 2014/0122434 A1 | 5/2014 | Knight et al. |
| 2014/0149695 A1 | 5/2014 | Zaslavsky et al. |
| 2014/0164330 A1 | 6/2014 | Barnes et al. |
| 2014/0164660 A1 | 6/2014 | DeCesaris et al. |
| 2014/0258241 A1 | 9/2014 | Chen et al. |
| 2014/0258613 A1 | 9/2014 | Sampathkumar |
| 2015/0227432 A1 | 8/2015 | Jaquette et al. |
| 2015/0227433 A1 | 8/2015 | Jaquette et al. |
| 2015/0227438 A1 | 8/2015 | Jaquette et al. |
| 2015/0227575 A1 | 8/2015 | Jaquette et al. |
| 2015/0310080 A1 | 10/2015 | Jaquette et al. |
| 2019/0310995 A1 | 10/2019 | Jaquette et al. |

FOREIGN PATENT DOCUMENTS

| | | |
|---|---|---|
| CN | 101149694 A | 3/2008 |
| CN | 102236589 A | 11/2011 |
| CN | 103262043 A | 8/2013 |
| EP | 2234018 A1 | 9/2010 |
| JP | 2005038176 A | 2/2005 |
| JP | 2005292865 A | 10/2005 |
| JP | 2007317186 A | 12/2007 |
| JP | 2008250667 A | 10/2008 |
| JP | 2010026939 | 10/2008 |
| JP | 2012014286 A | 1/2012 |
| JP | 2012146301 A | 8/2012 |
| WO | 9308529 A1 | 4/1993 |
| WO | 2001001257 | 1/2001 |
| WO | 2010065271 A2 | 6/2010 |
| WO | 20130175422 | 6/2010 |

OTHER PUBLICATIONS

Response dated Apr. 11, 2019, pp. 14, Office Action dated Jan. 11, 2019 pp. 24, for U.S. Appl. No. 14/175,975.

Notice of Allowance dated Apr. 8, 2019, pp. 27, for U.S. Appl. No. 14/263,917.

Final Office Action dated Aug. 28, 2019, pp. 52, for U.S. Appl. No. 14/175,975.

U.S. Appl. No. 16/449,271, filed Jun. 21, 2019.

Preliminary Amendment filed Jun. 21, 2019, pp. 8, for U.S. Appl. No. 16/449,271.

Final Office Action dated Aug. 28, 2019, pp. 44, for U.S. Appl. No. 14/175,964.

Office Action dated Jan. 11, 2019 pp. 24, for U.S. Appl. No. 14/175,975.

U.S. Appl. No. 14/175,980, filed Feb. 7, 2014.

(56) References Cited

OTHER PUBLICATIONS

Office Action dated Jul. 21, 2016, pp. 52, for U.S. Appl. No. 14/175,980, filed Feb. 7, 2014.
Response dated Oct. 21, 2016, pp. 14, for U.S. Appl. No. 14/175,980, filed Feb. 7, 2014.
Final Office Action dated Feb. 10, 2017, pp. 29, for U.S. Appl. No. 14/175,980, filed Feb. 7, 2014.
RCE/Amendment dated May 10, 2017, pp. 15, to Final Office Action dated Feb. 10, 2017, pp. 29, for U.S. Appl. No. 14/175,980, filed Feb. 7, 2014.
Notice of Allowance dated Sep. 12, 2017, pp. 21, for U.S. Appl. No. 14/175,980, filed Feb. 7, 2014.
Notice of Allowance dated Dec. 13, 2018, pp. 22, for U.S. Appl. No. 14/175,980.
U.S. Appl. No. 14/175,987, filed Feb. 7, 2014.
Office Action dated Feb. 9, 2016, pp. 49, for U.S. Appl. No. 14/175,987, filed Feb. 7, 2014.
Response dated May 9, 2016, pp. 16, to Office Action dated Feb. 9, 2016, pp. 49, for U.S. Appl. No. 14/175,987, filed Feb. 7, 2014.
Final Office Action dated Jul. 20, 2016, pp. 40, for U.S. Appl. No. 14/175,987, filed Feb. 7, 2014.
RCE Response dated Oct. 20, 2016, pp. 17, to Final Office Action dated Jul. 20, 2016, pp. 40, for U.S. Appl. No. 14/175,987, filed Feb. 7, 2014.
Notice of Allowance dated Jan. 26, 2017, pp. 21, for U.S. Appl. No. 14/175,987, filed Feb. 7, 2014.
Notice of Allowance dated Jul. 13, 2017, pp. 15, for U.S. Appl. No. 14/175,987, filed Feb. 7, 2014.
RCE/IDS filed Aug. 25, 2017 for U.S. Appl. No. 14/175,987, filed Feb. 7, 2017.
Notice of Allowance dated Nov. 7, 2017, pp. 24, for U.S. Appl. No. 14/175,987, filed Feb. 7, 2017.
Notice of Allowance dated Apr. 9, 2018, pp. 28, for U.S. Appl. No. 14/175,987, filed Feb. 7, 2017.
U.S. Appl. No. 14/263,917, filed Apr. 28, 2014.
Office Action dated May 20, 2016, pp. 52, for U.S. Appl. No. 14/263,917, filed Apr. 28, 2014.
Response dated Aug. 22, 2016, pp. 17, to Office Action dated May 20, 2016, pp. 52, for U.S. Appl. No. 14/263,917, filed Apr. 28, 2014.
Final Office Action dated Sep. 22, 2016, pp. 33, for U.S. Appl. No. 14/263,917, filed Apr. 28, 2014.
Response dated Dec. 20, 2016, pp. 15, to Office Action dated May 20, 2016, pp. 52, for U.S. Appl. No. 14/263,917, filed Apr. 28, 2014.
Advisory Action dated Jan. 23, 2017, pp. 8, for U.S. Appl. No. 14/263,917, filed Apr. 28, 2014.
Preliminary Amendment dated Jan. 24, 2017, pp. 12, for U.S. Appl. No. 14/263,917, filed Apr. 28, 2014.
Office Action dated Sep. 14, 2017, pp. 41, for U.S. Appl. No. 14/263,917, filed Apr. 28, 2014.
Response dated Dec. 14, 2017, pp. 17, to Office Action dated Sep. 14, 2017, pp. 41, for U.S. Appl. No. 14/263,917, filed Apr. 28, 2014.
Final Office Action dated Feb. 20, 2018, pp. 32, for U.S. Appl. No. 14/263,917, filed Apr. 28, 2014.
Pre-Appeal Brief Request dated May 21, 2018 for U.S. Appl. No. 14/263,917.
Office Action dated Aug. 10, 2018, pp. 15, for U.S. Appl. No. 14/263,917.
Response dated Nov. 13, 2018, pp. 15, to Office Action dated Aug. 10, 2018, pp. 15, for U.S. Appl. No. 14/263,917.
Notice of Allowance dated Jan. 30, 2019, pp. 42, for U.S. Appl. No. 14/263,917.
List of IBM Patents and Applications Treated as Related, dated Feb. 2019, pp. 2.
Chesarek, et al., "IBM System Storage FlashCopy Manager and PPRC Manager Overview", IBM Corporation, Document No. REDP-4065, pp. 62, 2008.
Burger, et al., "IBM System Storage DS8000 Series: IBM FlashCopy SE", IBM Corporation, Document No. REDP-4368-00, pp. 80, Feb. 2008.
Cronauer, et al., "IBM System Storage DS8000 Copy Services for Open Systems", IBM Corporation, Document No. SG24-6788-06, pp. 800, Feb. 2013.
PCT International Search Report and Written Opinion dated Jun. 15, 2015, for Application No. PCT/IB2015/050225, filed Jan. 12, 2015.
U.S. Pat. No. 8,666,944 is the English language counterpart of Chinese Patent No. 103262043.
English language translation of CN 1740981 filed Mar. 1, 2006.
English language translation of CN 102236589 filed Apr. 17, 2013.
English language translation of CN 103262043 filed Aug. 21, 2013.
PCT International Search Report and Written Opinion dated Sep. 6, 2015, for Application No. PCT/IB2015/052543, filed Apr. 8, 2015.
UK Examination Report dated Dec. 16, 2016, pp. 3, for Application No. 1619298.1, filed Apr. 8, 2015.
UK Reply to Examination Report dated Feb. 1, 2017, pp. 13, to UK Examination Report dated Dec. 16, 2016, pp. 3, for Application No. 1619298.1, filed Apr. 8, 2015.
CN Office Action dated Jul. 3, 2018, pp. 7, for Application No. 201580007367.
English Machine translation of CN Office Action dated Jul. 3, 2018, pp. 7, for Application No. 201580007367.
English Machine translation of CN1071770A, pp. 11.
English Machine translation of CN 101149694, pp. 8.
WO9308529A1 is the English counterpart of CN101149694A, pp. 34.
Robocopy.exe, Microsoft, Corpporation, Copyright 1985-2003, pp. 35.
English Machine translation of JP2005292865, dated Sep. 21, 2018, pp. 16.
English Machine translation of JP2007317186, dated Sep. 21, 2018, pp. 33.
English Machine translation of JP2008250667, dated Sep. 21, 2018, pp. 40.
English Machine translation of JP2012146301 dated Sep. 21, 2018, pp. 18.
JP Office Action dated Sep. 18, 2018, pp. 6, for Serial No. 2016-548352.
JP Office Action dated Jan. 8, 2019, pp. 4, for Serial No. 2016-562001.
English machine translation of JP Office Action dated Jan. 8, 2019, pp. 4, for Serial No. 2016-562001.
English machine translation of JP2005038176A dated Feb. 10, 2005, pp. 13.
English machine translation of JP2010026939 dated Feb. 4, 2010, pp. 23.
U.S. Pat. No. 8,738,874 dated May 27, 2014 is the English language equivalent of JP201126939 dated Feb. 4, 2010.
Final Office Action dated Feb. 5, 2019, pp. 3, Application No. JP2016-548352 filed Jan. 12, 2015.
English machine translation dated Feb. 11, 2019, pp. 4, of Final Office Action dated Feb. 5, 2019, pp. 3, Application No. JP2016-548352.
English machine translation dated Feb. 11, 2019, pp. 25 of JP2012014286 dated Jan. 19, 2012.
U.S. Appl. No. 14/175,964, filed Feb. 7, 2014.
Office Action dated Dec. 30, 2015, pp. 36, for U.S. Appl. No. 14/175,964, filed Feb. 7, 2014.
Response dated Mar. 30, 2016, pp. 15, to Office Action dated Dec. 30, 2015, pp. 36, for U.S. Appl. No. 14/175,964, filed Feb. 7, 2014.
Final Office Action dated Jul. 15, 2016, pp. 40, for U.S. Appl. No. 14/175,964, filed Feb. 7, 2014.
Response dated Oct. 17, 2016, pp. 14, to Final Office Action dated Jul. 15, 2016, pp. 40, for U.S. Appl. No. 14/175,964, filed Feb. 7, 2014.
RCE/Amend/IDS dated Nov. 15, 2016, pp. 14, to Final Office Action dated Jul. 15, 2016, pp. 40, for U.S. Appl. No. 14/175,964, filed Feb. 7, 2014.
Office Action dated Sep. 14, 2017, pp. 48, for U.S. Appl. No. 14/175,964, filed Feb. 7, 2014.
Response dated Dec. 14, 2017, pp. 15, to Office Action dated Sep. 14, 2017, pp. 48, for U.S. Appl. No. 14/175,964, filed Feb. 7, 2014.
Final Office Action 2 dated Apr. 30, 2018, pp. 33, for U.S. Appl. No. 14/175,964, filed Feb. 7, 2014.

(56) References Cited

OTHER PUBLICATIONS

Pre-Appeal Brief Request dated Jul. 30, 2018, pp. 6, for U.S. Appl. No. 14/175,964.
Office Action dated Jan. 10, 2019, pp. 15, for U.S. Appl. No. 14/175,964.
U.S. Appl. No. 14/175,975, filed Feb. 7, 2014.
Office Action dated Mar. 9, 2016, pp. 49, for U.S. Appl. No. 14/175,975, filed Feb. 7, 2014.
Response dated Jun. 29, 2016, pp. 14, to Office Action dated Mar. 9, 2016, pp. 49, for U.S. Appl. No. 14/175,975, filed Feb. 7, 2014.
Final Office Action dated Sep. 23, 2016, pp. 35, for U.S. Appl. No. 14/175,975, filed Feb. 7, 2014.
RCE/Response dated Jan. 23, 2017, pp. 14, to Final Office Action dated Sep. 23, 2016, pp. 35, for U.S. Appl. No. 14/175,975, filed Feb. 7, 2014.
Office Action dated Aug. 11, 2017, pp. 38, for U.S. Appl. No. 14/175,975, filed Feb. 7, 2014.
Response dated Nov. 13, 2017, pp. 16, to Office Action dated Aug. 11, 2017, pp. 38, for U.S. Appl. No. 14/175,975, filed Feb. 7, 2014.
Final Office Action dated Feb. 23, 2018, pp. 37, for U.S. Appl. No. 14/175,975, filed Feb. 7, 2014.
Pre-Appeal Brief Request dated Jun. 25, 2018, pp. 6, for U.S. Appl. No. 14/175,975.
Notice of Allowance dated Dec. 17, 2020, pp. 32, for U.S. Appl. No. 14/175,964.
Final Office action dated Dec. 18, 2020, pp. 43, for U.S. Appl. No. 14/175,975.
Response dated Sep. 18, 2020, pp. 15, to Office Action dated Jun. 18, 2020, pp. 24, for U.S. Appl. No. 14/175,975.
Notice of Allowance dated Oct. 5, 2020, pp. 27, for U.S. Appl. No. 14/175,964.
List of IBM Patents and Applications Treated as Related, dated Oct. 7, 2020, pp. 2.
Notice of Allowance dated Mar. 15, 2019, pp. 24, for U.S. Appl. No. 14/175,980.
Notice of Allowance dated Jul. 13, 2020, pp. 22, for U.S. Appl. No. 14/175,964.
Notice of Allowance6 dated May 22, 2019, pp. 32, for U.S. Appl. No. 14/175,980.
Office Action dated Jun. 11, 2021, pp. 67, for U.S. Appl. No. 16/449,271.
Response dated Mar. 19, 2021, pp. 14, to Final Office Action dated Dec. 18, 2020, pp. 43, for U.S. Appl. No. 14/175,975.
Pre-Appeal Brief dated May 9, 2021, pp. 5, for U.S. Appl. No. 14/175,975.
Notice of Allowance dated Jun. 24, 2021, pp. 23, for U.S. Appl. No. 14/175,975.
Pre Appeal Brief dated Dec. 30, 2019, pp. 6, for U.S. Appl. No. 14/175,964.
Appeal Brief dated Mar. 5, 2020, pp. 26, for U.S. Appl. No. 14/175,964.

* cited by examiner

CREATING A RESTORE COPY FROM A COPY OF SOURCE DATA IN A REPOSITORY HAVING SOURCE DATA AT DIFFERENT POINT-IN-TIMES

BACKGROUND OF THE INVENTION

1. Field of the Invention

The present invention relates to a computer program product, system, and method for creating a restore copy from a copy of source data in a repository having source data at different point-in-times.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The PiT copy appears instantaneous because complete is returned to the copy operation in response to generating the relationship data structures without copying the data from the source to the target volumes. PiT copy techniques typically defer the transfer of the data in the source volume at the time the PiT copy relationship was established to the copy target volume until a write operation is requested to that data block on the source volume. Data transfers may also proceed as a background copy process with minimal impact on system performance. The PiT copy relationships that are immediately established in response to the PiT copy command include a bitmap or other data structure indicating the location of blocks in the volume at either the source volume or the copy volume. The PiT copy comprises the combination of the data in the source volume and the data to be overwritten by the updates transferred to the target volume.

When an update to a block in the source volume involved in a PiT copy relationship is received, the copy of the track as of the point-in-time must be copied to side file or the target volume before the new data for the track is written to the source volume, overwriting the point-in-time copy of the data.

SUMMARY

Provided are a computer program product, system, and method for creating a restore copy from a copy of source data in a repository having source data at different point-in-times. All the source data as of an initial point-in-time is copied to a repository. Point-in-time copies are initiated at different point-in-times of the source data following the initial point-in-time. In response to completing each of the point-in-time copies, transmitting to the repository change information indicating changed data in the source data that changed between the point-in-time of the point-in-time copy and a subsequent point-in-time. For each point-in-time copy, copying changed source data comprising source data indicated in the change information for the point-in-time copy as changed to the repository. A restore request is received to restore the source data as of a restore point-in-time. A determination is made of the source data in the repository as of the restore point-in-time and the determined source data is copied from the repository to a restore copy.

DETAILED DESCRIPTION

Described embodiments provide techniques for creating a repository to maintain a full copy of the source data and point-in-time copies of the source data to allow the source data to be restored from the repository at different point-in-times. Further, with described embodiments, the operations to maintain the point-in-time ("PiT") copy information in the repository and perform the restore operations may be performed by a program component separate from the storage controller logic creating the PiT copies from the source data, so that the repository is separately maintained, used, and managed from the storage controller.

Figure 1:
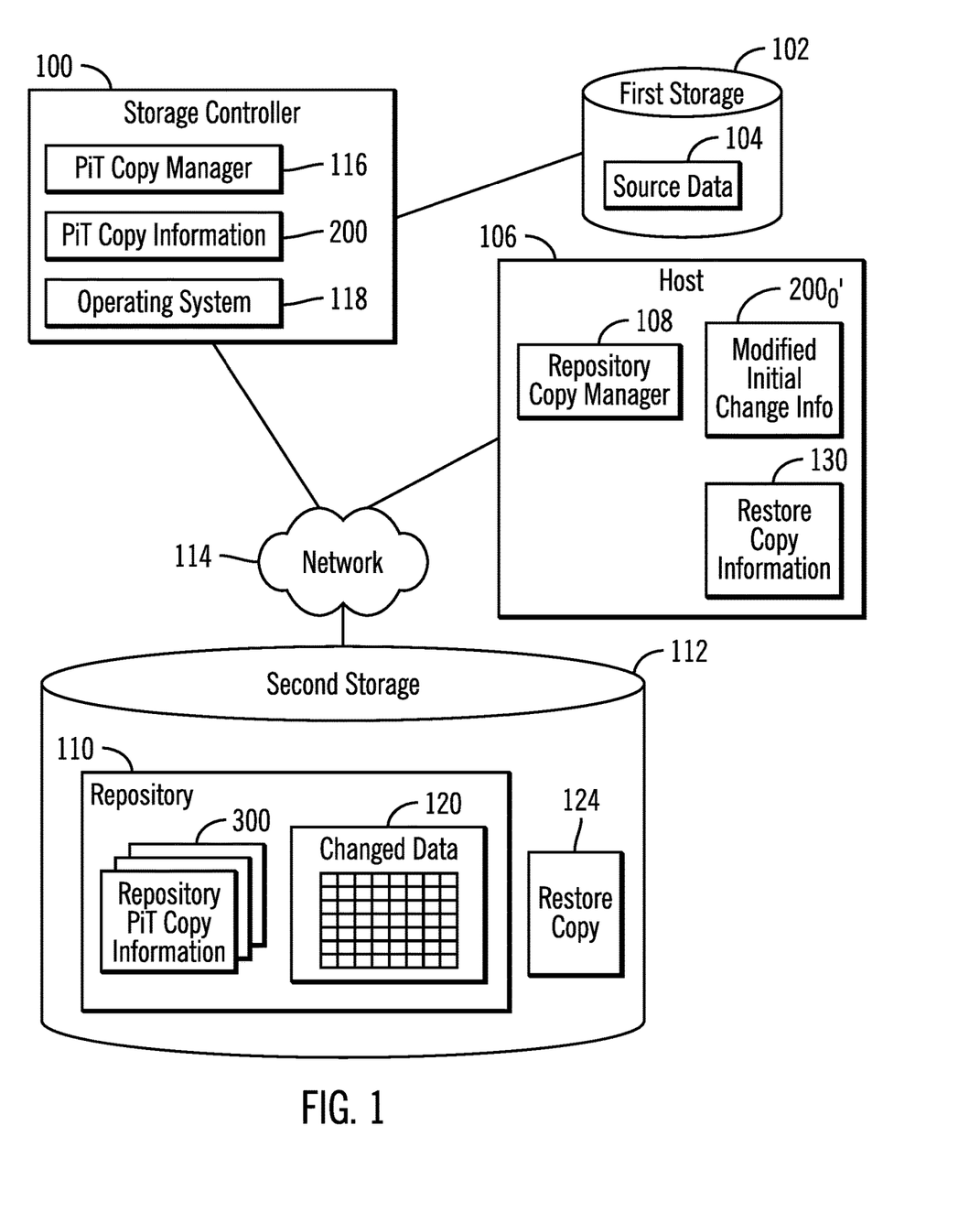
FIG. 1 illustrates an embodiment of a storage environment.

FIG. 1 illustrates an embodiment of a data storage environment having a storage controller 100 managing access to a first storage 102 that includes source data 104, such as a production volume used by different host systems. A host 106 includes a repository copy manager program 108 to manage the copying of the source data 104 to a repository 110 in a second storage 112. The storage controller 100, host 106, and second storage 112 may communicate over a network 114.

The storage controller 100 includes a point-in-time ("PiT") copy manager 116 to create point-in-time copies of the source data 104, e.g., FlashCopy, snapshot, etc. When creating a PiT copy, the PiT copy manager 116 generates PiT copy information 200a on the PiT copy created as of a point-in-time. The storage controller 100 further includes an operating system 118, including the code and logic to manage Input/Output ("I/O") requests to the source data 104. The operating system 118 may configure the source data 104 in one or more volumes and data is stored in data units, such as tracks, logical block addresses (LBAs), extents, etc. The PiT copy manager 116 may be a copy service supplied with the operating system 118.

The storages 102 and 112 may store tracks in a Redundant Array of Independent Disks (RAID) configuration where strides of tracks are written across multiple storage devices comprising the storages 102 and 112. The storages 102 and 112 may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The network 114 may comprise a network such as one or more interconnected Local Area Networks (LAN), Storage Area Networks (SAN), Wide Area Network (WAN), peer-to-peer network, wireless network, etc.

The PiT copy manager 116 performs a PiT copy operation that replicates data in a manner that appears instantaneous and allows a process to continue accessing the source volume while actual data transfers to the copy volume are deferred to a later time. The PiT copy appears instantaneous because complete is returned to the copy operation in response to generating the relationship data structures without copying the data.

The repository copy manager 108 copies the source data 104 at different point-in-times to the repository 110, including an initial copy of all the source data, and copies the PiT copy information 200 at the storage controller 100 to the repository 110 to store as repository PiT copy information 300 in the repository 110. The repository copy manager 108 uses the PiT copy information 300 to determine changed data at the source data 104 to copy to the repository 110 in the change data 120. To copy all the source data as of an initial point-in-time to the repository 110, the repository copy manager 108 may modify the change information for the initial PiT copy, or PiT bitmap, having a bit for each data unit in the source data 104 indicating whether the data has changed to generate modified initial change information $200_0'$ that indicates that each data unit in the source data 104 has changed. The repository copy manager 108 may then copy all the source data 104 indicated in the modified initial change information $200_0'$ to the changed data 120 in the repository 110 to provide a full copy of the source data 104 as of the initial point-in-time in the repository. The repository copy manager 108 may use the change information in PiT copy information 200 for PiT copies following the initial point-in-time to copy changed data at different point-in-times to the changed data 120 in the repository 110.

With described embodiments, the repository copy manager 108 maintains a separate full copy of the source data 104 and the PiT copy information 300 of the source data 104 in a separate storage 112 so that data can be restored to different point-in-times independently of the source data 104 in the first storage 102 and the PiT copy information 200a at the storage controller 100. Thus, the repository 110 by allowing for independent restore of the source data 104 provides a redundant secure backup independent of the storage controller 100 to protect from failure at the storage controller 100 or first storage 102.

In certain embodiments, the creation and management of the repository 110 is managed by a repository copy manager 108 that is separate from the storage controller 100 programs, such as the PiT copy manager 116 that creates the PiT copies.

To generate the restore copy 124, the repository copy manager 108 may utilize restore copy information 130 indicating the source data in the changed data 120 that needs to be copied to the restore copy 124.

In the embodiment of FIG. 1, the repository creation and restore operations may be performed by program components, such as the repository copy manager 108 that are separate from the storage controller logic, e.g., the PiT copy manager 116 that created the PiT copies. In an alternative embodiment, the repository copy manager 108 and/or the repository 110 may be maintained on the storage controller 100.

Figure 2:
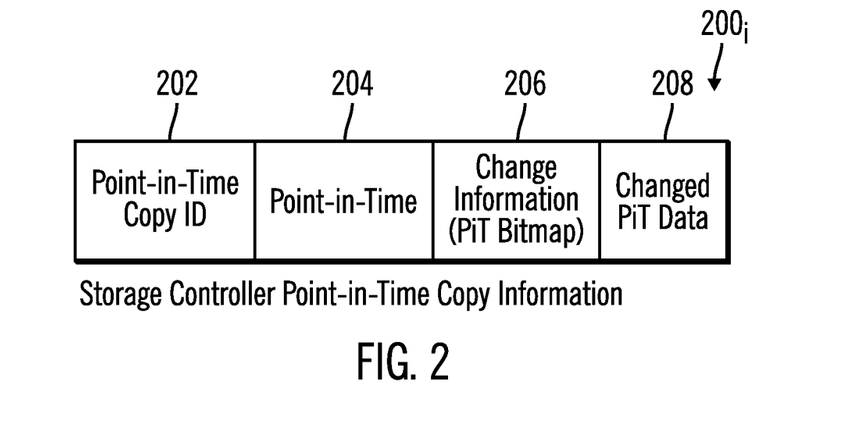
FIG. 2 illustrates an embodiment of storage controller point-in-time copy information.

FIG. 2 illustrates an instance of the PiT copy information $200_i$ for PiT copy at time $T_i$, which may comprise information maintained for the storage controller PiT copy information 200, and may include a PiT copy identifier 202 identifying the PiT copy created by the PiT copy manager 116 at the storage controller 100; a point-in-time 204 of the PiT copy 202, which may mean that data is consistent as of that point-in-time 204; change information 206 indicating which data or tracks in the source data 104 has changed since the point-in-time 204 and while the PiT copy 202 was open, which may comprise a bitmap having a bit for each data unit (e.g., track) that is set to one of two values indicating the data or track represented by the bit has or has not been updated since the point-in-time 204; and indicate the changed PiT data 208 comprising the data at the point-in-time 204 that was changed after the point-in-time 204 while the PiT copy 202 was open and still being updated. PiT copy information may be maintained for an initial PiT copy taken at the initial time $T_0$ and for subsequent PiT copies taken at subsequent point-in-times.

In one embodiment, the PiT copy may be completed or frozen at a time subsequent to the point-in-time 204, such that the changed PiT data 208 includes data changed from the point-in-time 204 until the PiT copy 202 was completed, e.g., frozen or a new PiT copy initiated, and does not include changed data after the PiT copy 202 was completed, e.g., frozen. A PiT copy 202 may be completed upon a freeze command or initiating a subsequent PiT copy at a subsequent point-in-time to the point-in-time 204. A completed PiT copy 200 may be consistent as of the point-in-time. Other techniques may be used to complete, e.g., freeze, the PiT copy.

Figure 3:
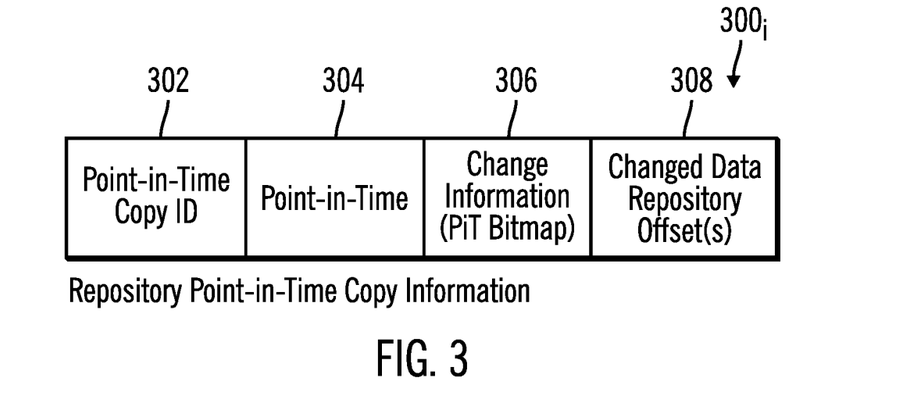
FIG. 3 illustrates an embodiment of repository point-in-time copy information.

FIG. 3 illustrates an embodiment of an instance of PiT copy information $300_i$ maintained in the repository 110, that is generated from an instance of PiT copy information $200_i$ from the storage controller 100, and includes a PiT copy identifier 302 identifying the PiT copy 202 created by the PiT copy manager 116 at the storage controller 100; a point-in-time 304 of the PiT copy 302, which may mean that data is consistent as of that point-in-time 304; change information 306 indicating which data or tracks in the source data 104 has changed since the point-in-time 304 and while the PiT copy 302 was open, which may comprise a bitmap; and a repository offset 308 indicating an offset in the changed data 120 at which the data indicated in the change information 306 for the PiT copy 302 is located. The location in the changed data 120 of a particular changed data unit for a PiT copy 302 can be determined at an offset from the repository offset 208 in the changed data 120, such as by summing the repository offset 208 with the number of the changed unit indicated in the change information 306, i.e., the jth data unit, times a length of the data unit. In this way, changed data from a PiT copy 300 are written sequentially after the last written data in the change data 120 in the repository 110.

Figure 4:
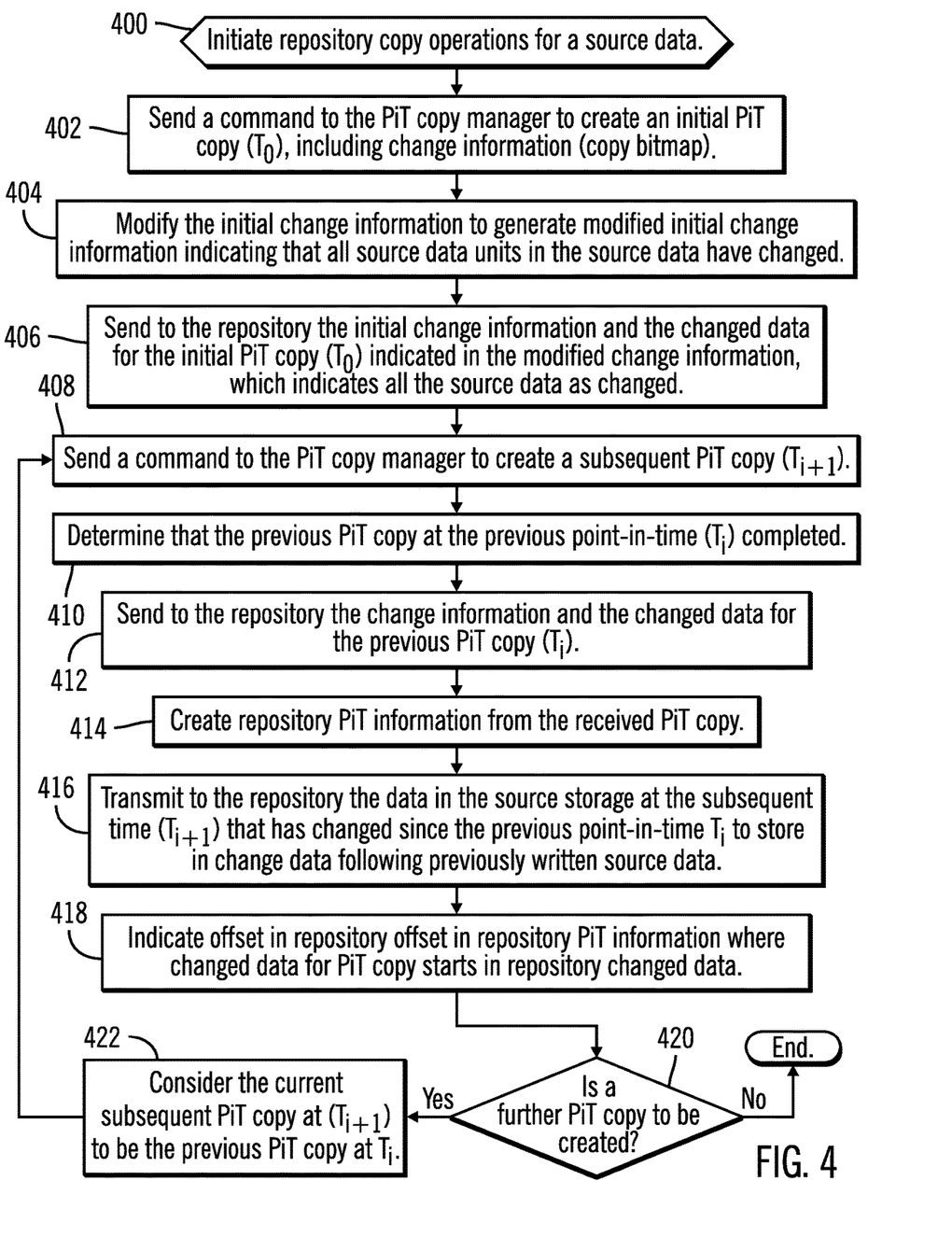
FIG. 4 illustrates an embodiment of operations to create a repository having the source data and point-in-time information of the source data at different point-in-times.

FIG. 4 illustrates an embodiment of operations performed by the repository copy manager 108 and the PiT copy manager 116 to copy the source data 104 to the repository 110 at different points-in-time from the PiT copies for the source data 104, such as a production volume, created by the PiT copy manager 116. Upon initiating (at block 400) repository copy operations for source data 104, the repository copy manager 108 sends (at block 402) a command to the PiT copy manager 116 to create an initial PiT copy $200_0$ at an initial point-in-time, referred to herein as $T_0$. The repository copy manager 108 may modify the initial change information $200_0$ to generate modified initial change $200_0'$ indicating that all source data units in the source data have changed. The repository copy manager 108 may send (at block 406) to the repository 110 the modified initial change information $200_0'$, which indicates that all data units have changed and the changed PiT data $208_0$ for the initial PiT copy ($T_0$) indicated in the modified initial change information $200_0'$, which indicates all the source data as changed. All the source data as of the initial point-in-time is copied to the changed data 120 in the repository 110. The PiT copy $200_0'$ from the storage controller 100 would be stored as PiT copy information $300_0$ with a repository offset 308 of zero because the start of the data from the initial PiT copy $T_0$ is stored at the beginning of the changed data 120 in the repository 110.

The repository copy manager 108 may send (at block 408) a command to the PiT copy manager 116 to create a subsequent PiT copy ($T_{i+1}$) at a subsequent point-in-time $T_{i+1}$, which would result in PiT copy information $200_{(i+1)}$. In one embodiment, the repository copy manager 108 may send individual commands to the PiT copy manager 116 to create PiT copies and freeze a previously created PiT copy. In an alternative embodiment, the repository copy manager 108 may send one command to the PiT copy manager 116 to instruct it to periodically create PiT copies of the source data 104, where the creation of a subsequent PiT copy freezes the previously created PiT copy. Still further, the PiT copy manager 116 at the storage controller 100 may be independently creating PiT copies without prompting from the repository copy manager 108.

Upon determining (at block 410) that the previous point-in-time copy at $T_i$ completed, the repository copy manager 116 sends (at block 412) to the repository 110 for storage the PiT copy information $200_i$ for the PiT copy at time $T_i$, including the change information $206_i$, and the changed PiT data $208_i$, to store in the repository PiT copy information $300_i$ for $T_i$. In one embodiment, a PiT copy at point-in-time $T_i$ may be completed upon the creation of the subsequent PiT copy at time $T_{i+1}$. In an alternative embodiment, a PiT copy may be completed by issuing a freeze command to freeze the PiT copy so that the change information 206 stops indicating changes to the source data 104. The repository copy manager 108 creates (at bock 414) in the repository PiT copy information $300_i$ from the received PiT copy information $200_i$.

The repository copy manager 108 may transmit (at block 416) the source data 104 at the subsequent time ($T_{i+1}$) that has changed since the previous time to the changed data 120 in the repository 110 to make the full copy current as of the subsequent time $T_{i+1}$. To perform this operation, the repository copy manager 108 may determine from the change information 206 for the previous PiT copy at $T_i$ the data units in the source data 104 that have changed and then copy those data units from the source data 104 to the changed data 120. In this way, at the subsequent point-in-time $T_{i+1}$ when the subsequent PiT copy ($T_{i+1}$) is created, data units in the source data 104 that have changed between the previous point-in-time $T_i$ and the subsequent point-in-time $T_{i+1}$ are copied to the changed data 120 in the repository 110.

The repository copy manager 108 may indicate (at block 418) in the repository offset 308 the data unit offset in the changed data 120 where the changed data for the PiT copy at $T_i$ begins in the changed data 120. If (at block 420) further point-in-time copies are to be created, then the repository copy manager 108 considers (at block 422) the current subsequent point-in-time copy at ($T_{i+1}$) to be the previous point-in-time copy at $T_i$ during the next iteration of processing the next PiT copy. In this way, i is effectively incremented as the current subsequent point-in-time $T_{i+1}$ becomes the previous point-in-time and a next point-in-time becomes the new subsequent point-in-time. Control then proceeds back to block 408 to create or process a new subsequent PiT copy ($T_{i+1}$) at a new subsequent point-in-time $T_{i+1}$. If (at block 420) there are no further PiT copies to process, then control ends.

With the described embodiments of FIG. 4, a repository 110 of a full copy of the source data 104 having PiT copy information for different PiT copies is created independently of the storage controller 100 operations to create the PiT copies. In this way, the logic or operations of the repository management operations are independent of the storage controller 100 logic to create PiT copies.

Figure 5A:
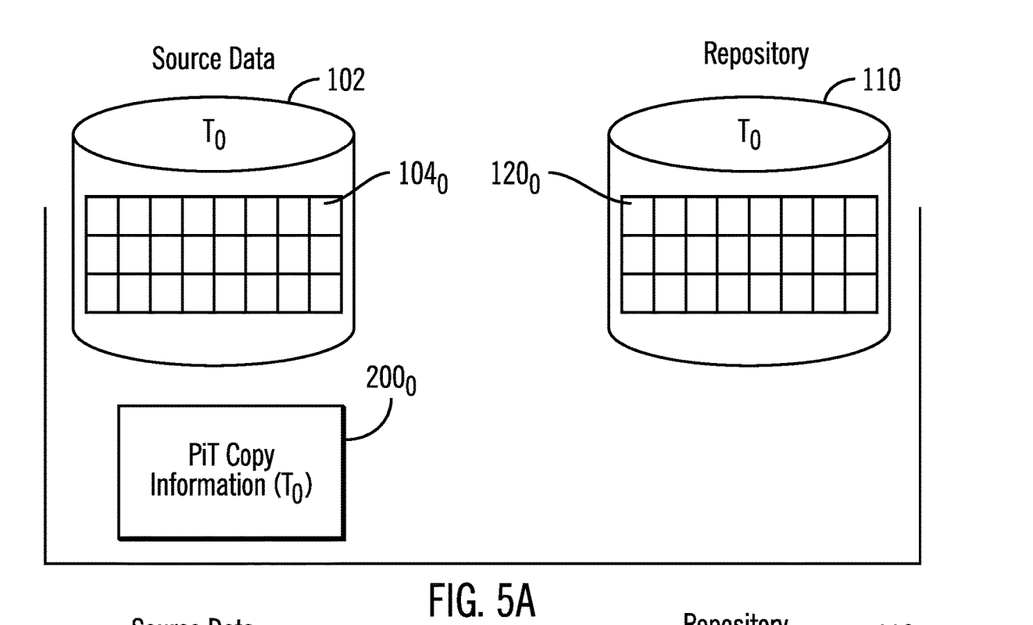
FIGS. 5a, 5b, and 5c illustrate examples of states of the source data and the repository at different point-in-times.
Figure 5B:
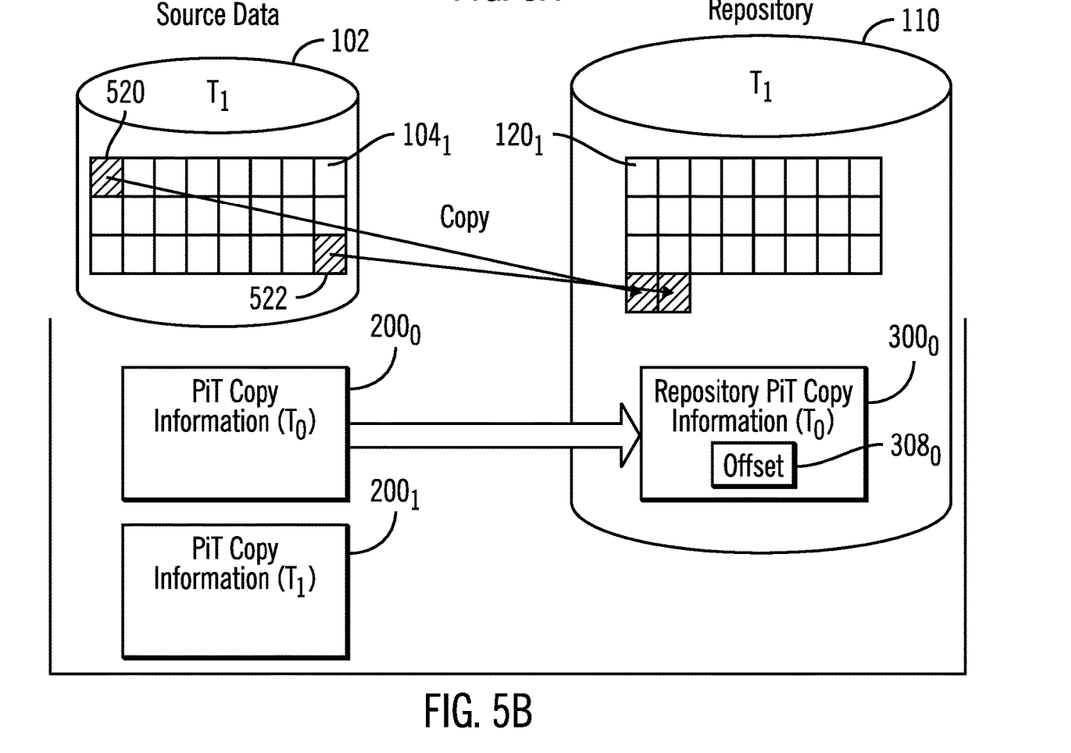
Figure 5C:
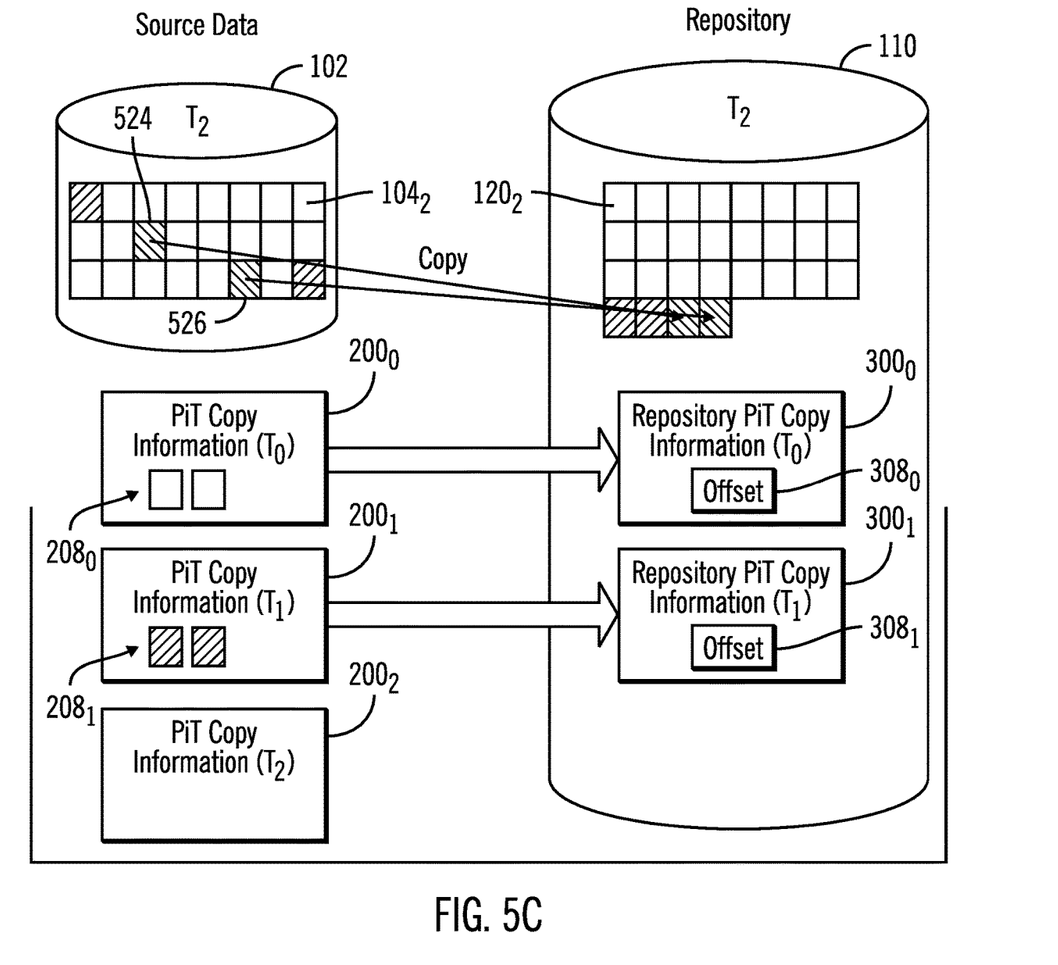

FIGS. 5a, 5b, 5c illustrate an example of the operations of FIG. 4 to copy all the source data at different point-in-times to the changed data 120 and repository PiT copy information 200b. FIG. 5a shows the state at an initial time $T_0$ of the source data $104_0$ in the source storage 102 that is copied to the changed data $120_0$ in the repository 110, which may comprise all the source data 104 as of the initial time $T_0$. Further, a PiT information copy $200_0$ is created at the initial time $T_0$ which has change information $206_0'$ indicating that all the source data has changed at the storage controller 100.

FIG. 5b shows a time $T_1$ when a second PiT copy $200_1$ at $T_1$ is created, which may result in the completion or freezing of the previous PiT copy $200_0$ at $T_0$ having changed data $208_0$ as of the point-in-time $T_0$ before changes occurring between $T_0$ and $T_1$. The repository copy manager 108 copies the changed data between $T_0$ and $T_1$, shown as units 520 and 522, to the changed data $120_1$ in the repository 110 to update the changed data $120_1$ to have changed data 520, 522 as of $T_1$, which follows the initial written data. Further, the completed, or frozen, PiT copy information $200_0$ at $T_0$ is copied to the repository 110 to store as repository PiT copy $300_0$, which includes an offset $308_0$ indicating zero because the source data for the initial PiT copy $200_0$ is the first data written to the changed data $120_1$.

FIG. 5c shows a time $T_2$ when a third PiT copy $200_2$ at $T_2$ is created, which may result in the completion or freezing of the PiT copy $200_1$ at $T_1$ having changed data $208_1$ as of the point-in-time $T_1$ before changes occurring between $T_1$ and $T_2$. The repository copy manager 108 copies the changed data between $T_1$ and $T_2$, shown as 524 and 526, to the repository 110 to update the changed data $120_2$ to have data as of $T_2$. Further, the completed, or frozen, PiT copy information $200_1$ at $T_1$ is copied to the repository 110 to store as repository PiT copy $300_1$, which includes a repository offset $308_1$ indicating the data unit offset in the repository $120_2$ at which the changed data 520 and 522 begins.

Figure 6:
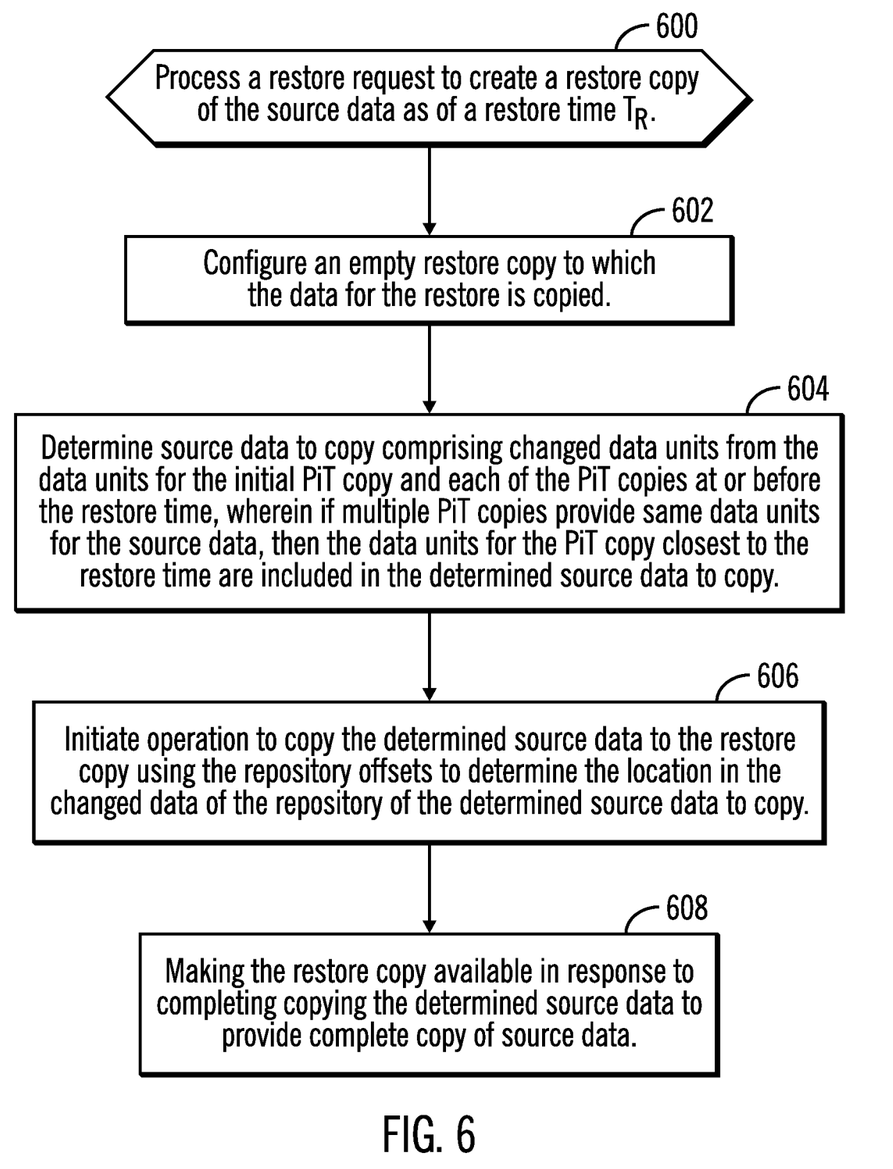
FIG. 6 illustrates an embodiment of operations to create a restore copy.

FIG. 6 illustrates an embodiment of operations performed by the repository copy manager 108 to create a restore copy 124 from the repository 110 as of a restore time ($T_R$), which may comprise a point-in-time of one of the repository point-in-time copies $200_b$. Upon processing (at block 600) a restore request to create a restore copy 124 of the source data as of the restore time ($T_R$), the restore copy manager 108 configures (at block 602) an empty restore copy 124 or restore volume to which the data from the changed data 120 for the restore is copied. The repository copy manager 108 determines (at block 604) source data to copy to the restore copy 124 comprising changed data units from the changed data 120 from the initial PiT copy $200_0$, data copied as part of the initial PiT copy, and each of the point-in-time copies at or before the restore time. If multiple PiT copies 300 provide same data units for the source data, then the data units for the PiT copy closest in time to the restore time are included in the determined source data to copy. The repository copy manager 108 then initiates (at block 606) an operation to copy the determined source data to the restore copy 124. The repository copy manager 108 makes (at block 608) the restore copy 124 available in response to completing copying the determined source data to provide a complete copy of the source data as of the restore time ($T_R$).

Figure 7:
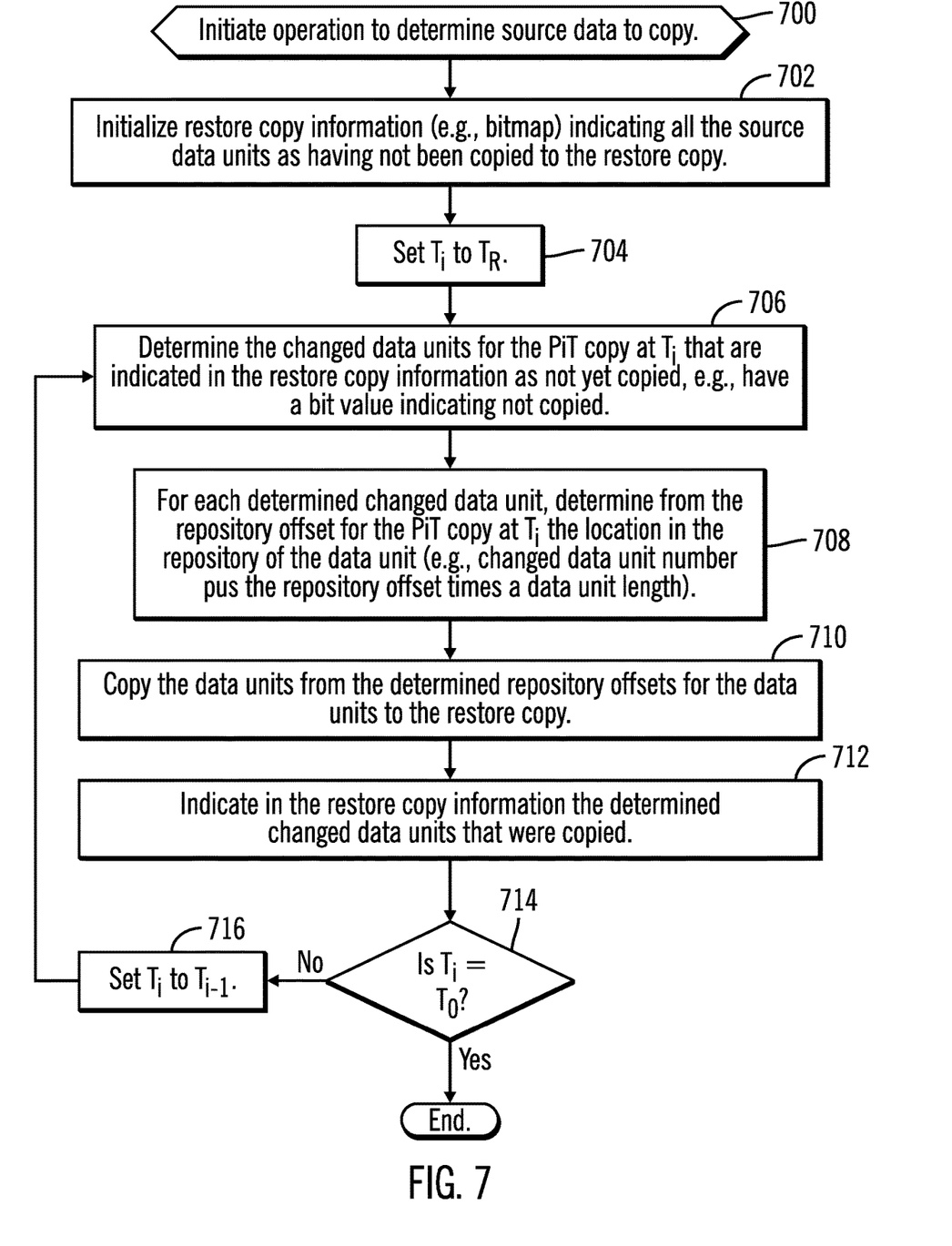
FIG. 7 illustrates an embodiment of operations to determine source data to copy to the restore copy.

FIG. 7 illustrates an embodiment of operations to determine the source data in the changed data 120 in the repository 124 to copy to the restore copy 124, such as the operation performed at block 604 in FIG. 6. Upon initiating the operation (at block 700) to determine the source data to copy from the changed data 120, the repository copy manager 108 initializes (at block 702) restore copy information 130, such as a bitmap, indicating all the source data units as having not been copied to the restore copy 124. $T_i$ is set (at block 704) to $T_R$. The repository copy manager 106 determines (at block 706) the changed data units 120 for the PiT copy $300_i$ at time $T_i$ that are indicated in the restore copy information 130 as not yet copied, e.g., have a bit value indicating not copied.

For each determined changed data unit at step 706, the repository copy manager 106 determines (at block 708) from the repository offset 308 for the PiT copy at Ti the location in the repository of the data unit (e.g., changed data unit number pus the repository offset times a data unit length). In one embodiment, the repository offset 308 may provide information for the first changed data unit of the PiT copy and the repository copy manager 108 must determine the offset for a particular data unit based on the number of the changed data unit, i.e., jth changed data unit indicated in the PiT copy change information $306_i$ plus the repository offset $308_i$, then that sum times a data unit length. Alternatively, the repository offset 308 may indicate the offset number in the changed data 120 for each changed data unit for PiT copies following the initial PiT copy at $T_0$.

For instance, in an embodiment, where the repository offset 308i comprises an offset at which the changed data for the PiT copy at Ti begins in the changed data 120, the determined location may comprise the changed data unit number, comprising the number in the order in which the data unit was written for the PiT copy at Ti, plus the repository offset 308i for the PiT copy at Ti, with this sum multiplied by the data unit length. For instance, if the data unit is the third data unit for the PiT copy at Ti written to the changed data 120 and the data unit number offset at which the changed data for the PiT copy at Ti begins in the change data 120 is 100, and the data unit length is 16 bytes, then the location for the data unit in the changed data 120 comprises the sum of three times 100 multiplied by 16, e.g., (3+100)× 16, which equals $4800^{th}$ byte in the changed data 120.

The determined changed data units from the PiT copy $300_i$, whose location in the changed data 120 is determined at block 708, are copied (at block 710) to the restore copy 124 from the determined locations and the copied data units are indicated (at block 712) in the restore copy information 130 as copied. If (at block 714) $T_i$ equals $T_0$, then all PiT copies 300 at or before the restore time ($T_R$) have been considered, and control ends. Otherwise, if $T_i$ does not equal $T_0$, then $T_i$ is set (at block 716) to $T_{i-1}$ to proceed back to block 706 to consider the next PiT copy $300_{i-1}$ immediately preceding the last considered PiT copy $300_i$. With the operations of FIG. 7, changed data units are determined from the PiT copies from the PiT copy closest to the restore time in reverse temporal order. In this way, if multiple PiT copies provide changed data for the same source data unit, then the changed data that is copied comes from the PiT copy providing changed data for that data unit that is closest in time to the restore time $T_R$ so that the restore copy 124 is provided with changed data 120 from the repository 110 as of the restore time $T_R$.

In the embodiment of FIG. 7, the changed data units are copied for a PiT copy being considered before the next PiT copy is considered. In an alternative embodiment, all the source data units to copy from the different PiT copies may be determined before copying the changed data to the restore copy 124.

Described embodiments provide techniques to create a repository having all source data units as of an initial time, including source data units that have changed between PiT copies taken of the source data 104 since an initial time. The repository further maintains PiT copy information of the PiT copies created of the source data 104. With described embodiments, a restore copy volume may be created as of a restore time from the changed data in the repository using the PiT copy information in the repository to determine the changed data as of the restore time by considering the PiT copy information for PiT copies at or before the restore time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
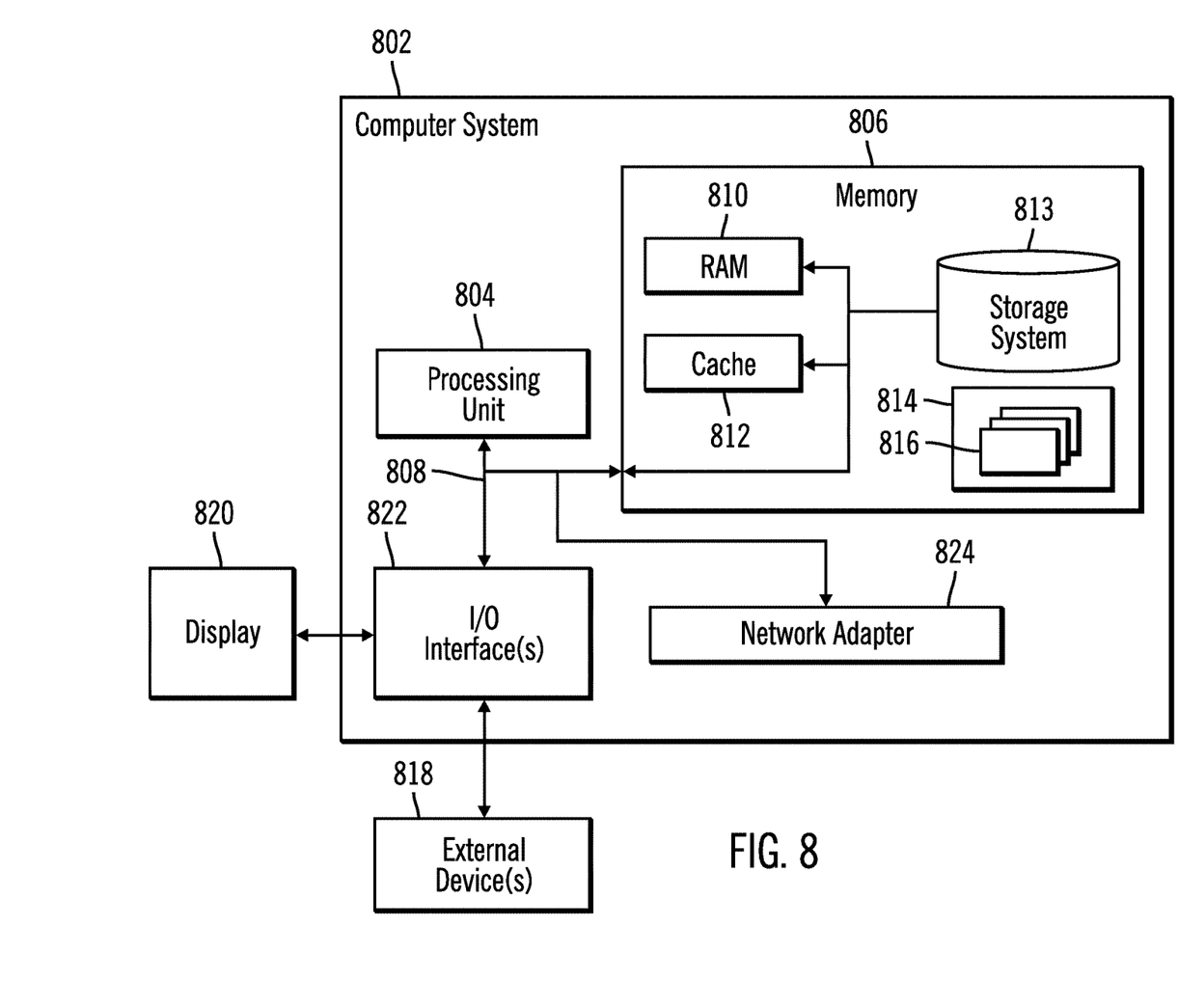
FIG. 8 illustrates a computing environment in which the components of FIG. 1 may be implemented.

The computational components of FIG. 1, including the storage controller 100 and host 106, may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining source data in a repository, wherein the computer program product comprises a computer readable storage medium having program instructions that when executed by a processor cause operations, the operations comprising:

storing, in a repository, change information for a plurality of point-in-time copies, wherein the change information for each point-in-time copy i at a point-in-time $T_i$ of the point-in-time copies indicates changed point-in-time data locations in the source data that changed between the point-in-time $T_i$ and a subsequent point-in-time $T_{i+1}$ of a point-in-time copy i+1;

writing changed point-in-time data for the point-in-time copies sequentially to a changed data section in the repository, wherein the changed point-in-time data for each point-in-time copy i comprises the source data as of the point-in-time $T_i$ indicated in the change information for the point-in-time copy i as changed, wherein changed point-in-time data for the point-in-time copy i is written sequentially to the changed data section after last written changed point-in-time data for a previous point-in-time copy having an earlier point-in-time than the point-in-time $T_i$, and wherein changed point-in-time data for one of the point-in-time copies that is at non-contiguous locations in the source data is written to contiguous locations in the changed data section in the repository; and for each point-in-time copy i of the point-in-time copies, indicating an offset in the changed data section in the repository where changed point-in-time data for point-in-time copy i begins.

2. The computer program product of claim 1, wherein the point-in-time copies are generated by a point-in-time copy program at a storage controller managing access to the source data in a storage and wherein a repository copy program executed separately from the point-in-time copy program stores in the repository the change information and the changed point-in-time data indicated in the change information as changed.

3. The computer program product of claim 1, wherein the operations further comprise:

creating a point-in-time copy i+1; and receiving changed point-in-time data that changed between the point-in-time $T_i$ and the point-in-time $T_{i+1}$ of the point-in-time copy i+1 to store in the changed data section in the repository for the point-in-time copy i+1.

4. The computer program product of claim 3, wherein the operations further comprise:

in response to creating the point-in-time copy i+1 at point-in-time $T_{i+1}$, storing, in the repository, point-in-time copy information for point-in-time copy i indicating, for the point-in-time copy i, the change information and an offset into the repository having the changed point-in-time data at point-in-time i.

5. The computer program product of claim 1, wherein the operations further comprise:

receiving a restore request to restore the source data as of a restore point-in-time;

determining changed point-in-time data in the changed data section in the repository for point-in-time copies having point-in-times prior to the restore point-in-time; and copying the determined changed point-in-time data in the changed data section in the repository to a restore copy.

6. The computer program product of claim 5, wherein the determining the changed point-in-time data as of the restore point-in-time to copy to the restore copy comprises:

initializing restore copy information indicating all the source data as having not been copied to the restore copy; and for each point-in-time copy at or before the restore point-in-time, starting from a point-in-time copy closest to the restore point-in-time and considering point-in-time copies in reverse time order to determine the changed point-in-time data to include in the restore copy.

7. A system for maintaining source data in a repository, comprising:

a processor; and a computer readable storage medium including program instructions executed by the processor to perform operations, the operations comprising:

storing, in a repository, change information for a plurality of point-in-time copies, wherein the change information for each point-in-time copy i at a point-in-time $T_i$ of the point-in-time copies indicates changed point-in-time data locations in the source data that changed between the point-in-time $T_i$ and a subsequent point-in-time $T_{i+1}$ of a point-in-time copy i+1;

writing changed point-in-time data for the point-in-time copies sequentially to a changed data section in the repository, wherein the changed point-in-time data for each point-in-time copy i comprises the source data as of the point-in-time $T_i$ indicated in the change information for the point-in-time copy i as changed, wherein changed point-in-time data for the point-in-time copy i is written sequentially to the changed data section after last written changed point-in-time data for a previous point-in-time copy having an earlier point-in-time than the point-in-time $T_i$, and wherein changed point-in-time data for one of the point-in-time copies that is at non-contiguous locations in the source data is written to contiguous locations in the changed data section in the repository; and for each point-in-time copy i of the point-in-time copies, indicating an offset for each point-in-time copy i of the point-in-time copies, indicating an offset in the changed data section in the repository where changed point-in-time data for point-in-time copy i begins.

8. The system of claim 7, wherein the point-in-time copies are generated by a point-in-time copy program at a storage controller managing access to the source data in a storage and wherein a repository copy program executed separately from the point-in-time copy program stores in the repository the change information and the changed point-in-time data indicated in the change information as changed.

9. The system of claim 7, wherein the operations further comprise:

creating a point-in-time copy i+1; and receiving changed point-in-time data that changed between the point-in-time $T_i$ and the point-in-time $T_{i+1}$ of the point-in-time copy i+1 to store in the changed data section in the repository for the point-in-time copy i+1.

10. The system of claim 9, wherein the operations further comprise:

in response to creating the point-in-time copy i+1 at point-in-time $T_{i+1}$, storing, in the repository, point-in-time copy information for point-in-time copy i indicating, for the point-in-time copy i, the change information and an offset into the repository having the changed point-in-time data at point-in-time i.

11. The system of claim 7, wherein the operations further comprise:

receiving a restore request to restore the source data as of a restore point-in-time;

determining changed point-in-time data in the changed data section in the repository for point-in-time copies having point-in-times prior to the restore point-in-time; and copying the determined changed point-in-time data in the changed data section in the repository to a restore copy.

12. The system of claim 11, wherein the determining the changed point-in-time data as of the restore point-in-time to copy to the restore copy comprises:

initializing restore copy information indicating all the source data as having not been copied to the restore copy; and for each point-in-time copy at or before the restore point-in-time, starting from a point-in-time copy closest to the restore point-in-time and considering point-in-time copies in reverse time order to determine the changed point-in-time data to include in the restore copy.

13. A method for maintaining source data in a repository, comprising:

storing, in a repository, change information for a plurality of point-in-time copies, wherein the change information for each point-in-time copy i at a point-in-time $T_i$ of the point-in-time copies indicates changed point-in-time data locations in the source data that changed between the point-in-time $T_i$ and a subsequent point-in-time $T_{i+1}$ of a point-in-time copy i+1;

writing changed point-in-time data for the point-in-time copies sequentially to a changed data section in the repository, wherein the changed point-in-time data for each point-in-time copy i comprises the source data as of the point-in-time $T_i$ indicated in the change information for the point-in-time copy i as changed, wherein changed point-in-time data for the point-in-time copy i is written sequentially to the changed data section after last written changed point-in-time data for a previous point-in-time copy having an earlier point-in-time than the point-in-time $T_i$, and wherein changed point-in-time data for one of the point-in-time copies that is at non-contiguous locations in the source data is written to contiguous locations in the changed data section in the repository; and for each point-in-time copy i of the point-in-time copies, indicating an offset in the changed data section in the repository where changed point-in-time data for point-in-time copy i begins.

14. The method of claim 13, wherein the point-in-time copies are generated by a point-in-time copy program at a storage controller managing access to the source data in a storage and wherein a repository copy program executed separately from the point-in-time copy program stores in the repository the change information and the changed point-in-time data indicated in the change information as changed.

15. The method of claim 13, further comprising:
creating a point-in-time copy i+1; and
receiving changed point-in-time data that changed between the point-in-time $T_i$ and the point-in-time $T_{i+1}$ of the point-in-time copy i+1 to store in the changed data section in the repository for the point-in-time copy i+1.

16. The method of claim 15, further comprising:
in response to creating the point-in-time copy i+1 at point-in-time $T_{i+1}$, storing, in the repository, point-in-time copy information for point-in-time copy i indicating, for the point-in-time copy i, the change information and an offset into the repository having the changed point-in-time data at point-in-time i.

17. The method of claim 16, further comprising:
receiving a restore request to restore the source data as of a restore point-in-time;
determining changed point-in-time data in the changed data section in the repository for point-in-time copies having point-in-times prior to the restore point-in-time; and
copying the determined changed point-in-time data in the changed data section in the repository to a restore copy.

* * * * *